July 16, 1929.                H. HALPERIN ET AL                    1,721,018
                        MEANS FOR CABLE SHEATH BONDING
                              Filed Oct. 6, 1927

Witness:
William P. Kilroy

Inventors
Herman Halperin
Kenneth W. Miller
By Brown, Boettcher - Dienner
Attys.

Patented July 16, 1929.

1,721,018

UNITED STATES PATENT OFFICE.

HERMAN HALPERIN AND KENNETH W. MILLER, OF CHICAGO, ILLINOIS.

MEANS FOR CABLE-SHEATH BONDING.

Application filed October 6, 1927. Serial No. 224,339.

Our invention relates to a method of and means for bonding, and more particularly to a method and means of bonding together the sheaths ordinarily placed on the underground cables used in three phase transmission work.

It was formerly the practice in the underground three-phase transmission of alternating currents to place the three conductors in a single cable but as the values of the voltages and currents increase, in accordance with modern practice, this often becomes impracticable. This resulted in the adoption of the present method in which the conductors are placed in separate cables, which are placed in suitable conduits under ground. These cables are arranged substantially parallel and, of necessity, are not placed very far apart. In this arrangement several very serious objections arise, due to induced sheath voltages or currents.

When alternating currents flow in the conductors of single conductor cables, there is induced a voltage in each sheath, and this voltage is directly proportional to the current and the length of each section of cable between the manholes. If the sheaths of the three cables are connected by the ordinary method, which is solid bonding in each manhole, then this induced voltage causes a large current to flow in the sheath, with resultant heat losses that considerably reduce the current carrying capacity of the cable; for instance, about twenty per cent on a single-conductor 66-k. v. cable. If, however, the sheath lengths are made discontinuous by insulating joints and are specially connected by bonds or impedances, current may be prevented in the sheaths or greatly restricted, and the sheath losses practically eliminated. In this case the induced sheath voltages are not consumed in producing sheath current and are therefore present on the sheath.

Various methods have been proposed for connecting the discontinuous lengths of sheaths, some of which will be discussed. None of these methods have proved to be entirely satisfactory, all being open to several serious objections.

One of the methods referred to is known as the cross-bonding method. This is, in effect, simply sheath transposition. In practice it has several disadvantages. It does not lend itself readily to irregular conduit lengths, such as exist particularly around stations. Sheath voltages to ground at the intermediate portions of a three-length unit are the full amount which is induced in one sheath. During short circuits, these induced voltages increase in proportion to the current, and may reach large values. Also serious difficulties may be introduced into the location of faults by electrical methods, the electrical "signal" being transposed between cables and "carried by" the fault.

A second proposed method with which we are familiar employs single-phase iron-core reactors in series with the sheaths of single-conductor cables. In this case the circuit of the iron core is not closed. This is open to the objection that, during short circuits, when the current flowing would be several times normal, the voltage across the reactor would be correspondingly higher.

In a third method, which is an improvement of the second method above discussed, a single-phase iron-core reactor is connected in series with the sheaths of single-conductor cables and is grounded. In this third method, however, the core of the reactor is designed with a closed iron circuit so proportioned as to approach magnetic saturation under normal conditions. As a result, during flow of abnormal currents such as occur during short circuits, the core becomes saturated permitting a large amount of current to flow through the reactor thus limiting the voltage across the reactor, this voltage usually being about three times normal value. This eliminates, to a large extent, the possibility of dangerously high voltages existing on the cable sheaths, which might cause holes to be burned in the sheath of the cable or shock a workman touching the sheath. In connection with this method, the reactor coil may be grounded at its midpoint thus reducing the normal operating sheath voltage to ground to one-half the total amount induced in the sheath of one cable length. This reduces by at least fifty per cent the danger of trouble from A. C. electrolysis effects.

While this third method with its possibility of reducing the normal voltage between sheath and ground is a decided improvement over the first and second methods above discussed, it is open to several objections, the most serious of which is that during the flow of failure currents returning back to the station through the lead sheaths and reactors, the coil voltages are added in series to the voltage drop along the sheath, and the resultant voltages are unnecessarily large. A further objection is the necessity of providing a separate reactor for each phase, and the coils of these reactors are rather large and expensive, both of which factors add very materially to the cost of this method. We have found that the above noted objections can be avoided by using a single reactor having several coils properly connected to the sheaths of the cables to act in flux opposition. This practically eliminates the flow of induced sheath currents during normal operation, and prevents abnormally high sheath voltages during cable failures. By using a single reactor the cost of installation, as well as the cost of the reactors used, is greatly reduced as compared to the third method above discussed. Further objects and advantages of our invention will appear from the detail description.

In the drawings:—

Figure 1:
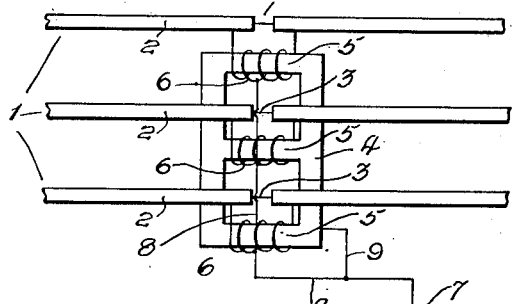
Fig. 1 is a diagrammatic view of our invention as applied showing the reactor coils connected in series with the sheaths of the respective cables.

In the method illustrated in Fig. 1, each of the cables 1 is provided with a sheath 2 usually of lead or lead alloy. This sheath is divided into sections or lengths by insulated joints 3, of any known type, the joints interrupting the electrical continuity of the sheath. Preferably, each sheath section extends from one man-hole to another, the insulated joints being located in the man-holes as is customary, though these joints may be located at other points also, if required.

Figure 3:
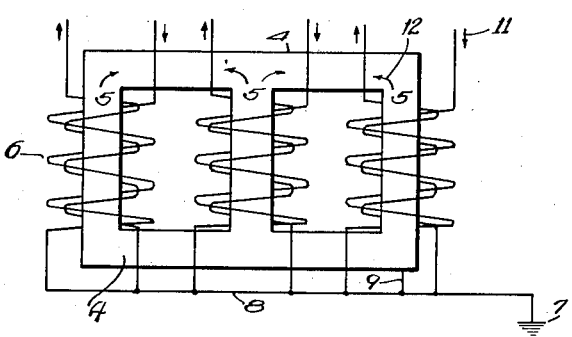
Fig. 3 is a semi-diagrammatic view of the reactor used in the method of Fig. 1.

A reactor such as that illustrated in Fig. 3 is used in the method of Fig. 1. This reactor has iron core members 5, one core for each phase. These cores are joined and magnetically closed at each end by the members 4, which permit flux interlinkages between the phases in any combination. Coils 6 are mounted about the respective cores. Each of these coils may be grounded at its centre at 7 by a wire 8, the same wire being used for grounding all of the coils. Coil 6 is thus, in effect, separated into two similar portions or sections. The three coils are all similarly wound so that the magnetic fluxes generated thereby in the core member 4 act in opposition when the currents are equal in phase and magnitude as indicated by the arrows 11 and 12, respectively, in Fig. 3. The core member 4 is also connected to wire 8, as at 9, so as to be grounded thereby. As shown in Fig. 1, the coils 6 bridge the joints 3 and are connected in series with the sheath lengths of the respective cables, these coils being grounded at their midpoints as noted.

During a failure on a line, in cases where a reactor of usual type is used, in addition to the voltages across the reactor on account of the induced voltage in its adjacent length of cable, there would be an additional voltage drop on account of the fault current flowing back over the sheaths and through the reactors to the stations at the ends of the faulted line. For example, on a 66 k. v., three phase, single-conductor, underground line, during a short circuit there would be a current of say 2,000 amperes flowing in the conductor of the faulted phase. If this 2,000 amperes would return entirely over the three cables of the given line, which would be practically the case in many instances, then the sheath of each cable would be carrying about one third of the current. This returning fault current, together with the voltages induced by the current in the copper, would cause an objectionably large voltage drop across single phase reactor coils, for with single phase reactor coils this voltage is limited only by flux saturation in the cores. With our invention this objection is avoided since the returning fault current flowing back over the sheaths of the three cables would be nearly equal in amount and phase on each sheath, and in the same direction through all of the coils of the three-coil reactor. This results in magnetic flux opposition in the iron core, as previously explained, so there would be practically no voltage drop in the coils due to this returning fault current.

Furthermore when an iron core is operated at and above the saturation point, the magnitude of the triple voltage harmonic becomes large resulting, in some instances, in a voltage increase as high as forty-percent from this factor alone. With our three-coil reactor, as is well known from three-phase transformer operation, triple and higher harmonics can not appear during normal operation, which is a decided advantage. Introduction of triple and higher voltage and current harmonics on power cable sheaths may cause interference on telephone circuits in adjacent duct structures due to the well known additive effects of these harmonics which are in phase for all three phases of the power circuit.

Also, during parallel flow of return failure current through the three coils of our reactor, the triple and higher harmonic voltages will be much smaller than in cases where a reactor which does not have the magnetic fluxes of its coils opposed is used. This is because, in our reactor, flux opposition exists for the largest portion of the return fault currents which are practically equally divided in the three coils. Only a small residual flux is produced in the core due to the inequality of division of the returning fault currents, and saturation of the iron core is absent or much reduced. As a result of the combination of the effects of flux opposition on the 60-cycle and triple and higher harmonic voltages during failures, the maximum voltage difference across our three-coil reactor for a 2000 ampere fault current would be but about thirty volts. The corresponding drop across a reactor of a type not having the fluxes of the coils acting in opposition would be fifty-five volts or higher.

It is an accepted law that currents and fluxes will always adjust themselves so that the total impedance or voltage drop across any electrical net-work will be a minimum. With flux linkages provided between the phases in our three coil reactor there is a greater freedom of adjustment so that our three-coil reactor can never give less protection than reactors of the other types above discussed, under any combination of short circuit currents in the cable conductors, or returning failure currents from the same or any other circuit, in general due to greater flexibility of current adjustment it will give much better protection.

Figure 2:
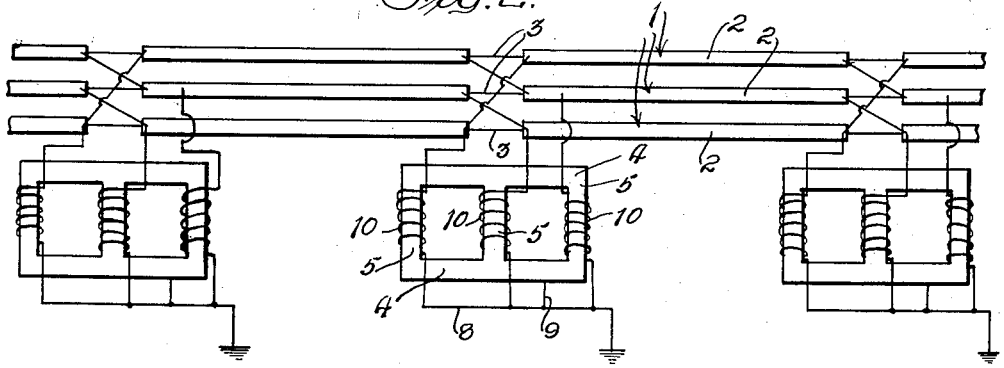
Fig. 2 is a diagrammatic view of our invention as applied showing the reactor coils connected to the cable sheaths, the latter being transposed.
Figure 4:
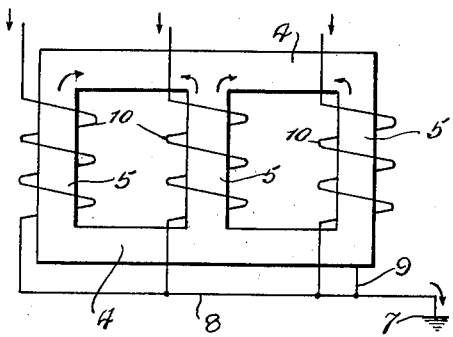
Fig. 4 is a semi-diagrammatic view of the reactor used in the method of Fig. 2.

In the method illustrated in Fig. 2. we use a three coil reactor such as that illustrated in Fig. 4. This reactor is similar to the reactor of Fig. 3, with the exception that the three coils 10 are continuous and are grounded at their ends instead of at their centers. These coils are connected in Y or "star" at their other ends to the lengths of sheaths of the respective cables, these sheath lengths being transposed by bonding as illustrated. In this method the normal sheath voltages to ground are about fifteen per cent higher than with the straight series connection shown in Fig. 1. It has the advantage, however, of the minimum voltage drop along the sheaths during the flow of return failure currents. When used with this connection, the principal advantages of our three-coil reactor are, its increased ability to pass fault current to ground due to the flux opposition effect, and its reduced size and cost.

In both methods we use but one three coil reactor with a single mounting at each joint, for the three cables. This effects a very material saving in cost, time, and space over other methods, such as those above discussed, using three single phase reactors and their mountings.

The efficiency of our reactor is due, principally, to the fact that the coils are so arranged and connected that their fluxes act in opposition during the parallel flow of return fault current through all three coils on an interlinking iron core. It is to be noted that during normal three-phase operation the current, voltage and magnetic flux vectors are not in opposition but rather in the normal three-phase relation so that the efficiency of preventing sheath currents under normal conditions is in no way impaired. The saturation or lack of saturation of the iron core under normal operating conditions is not essential. The core may, therefore, be so constructed and proportioned that it approaches magnetic saturation or not, as desired. Under ordinary conditions, however, we prefer that the core does not approach magnetic saturation under normal operating conditions.

It is to be noted that any direct current flowing through the sheaths, due to stray railway currents or any other causes, within practical limits will not saturate the core, because of the fact that these currents will divide nearly equally in the several cable sheaths and reactor coils and produce opposing magneto-motive forces within the iron core.

What we claim is:

1. In combination with the cable sheaths of a three-phase transmission system, a reactor including a core of magnetic material and three coils mounted on the core and relatively disposed to cause their magnetic fluxes to act in opposition, the sheaths having their electrical continuity interrupted and being divided into lengths, the coils bridging the gaps between adjacent ends of the sheath lengths of the respective cables.

2. In combination with the cable sheaths of a three phase transmission system, a reactor including a core of magnetic material and three coils mounted on the core and relatively disposed to cause their magnetic fluxes to act in opposition, the sheaths having their electrical continuity interrupted and being divided into lengths, the coils bridging the gaps between adjacent ends of the sheath lengths of the respective cables, and means electrically connecting the coils at their midpoints and grounding them.

3. In combination with the cable sheaths of a three phase transmission system, a reactor including a core of magnetic material having three coil receiving elements and coils mounted about the respective elements of the core and magnetically connected thereby, said coils being connected across the gaps between the sheath lengths of the respective cables and grounded, the coils being relatively disposed to cause their magnetic fluxes to act in opposition.

4. In combination with the cable sheaths of a three phase transmission system, a reactor including a core of magnetic material having three coil receiving elements and similarly directed coils mounted about the respective elements of the core, said coils being similarly connected across the gaps between the sheath lengths of the respective cables and grounded.

5. In combination with the cable sheath of a three-phase transmission system, a reactor including a core of magnetic material having three coil receiving elements and similarly disposed and wound coils mounted on said elements, said coils being similarly connected across the gaps between the sheath lengths of the respective cables and grounded.

6. In combination with the cable sheaths of a three phase transmission system, a reactor including a core of magnetic material having three coil receiving elements and similarly disposed and wound coils mounted on said elements, said coils being similarly connected to the sheath lengths of the respective cables and grounded, and the connections between the sheath lengths being transposed.

7. In combination with the cable sheaths of a three phase transmission system, a reactor including a core of magnetic material having three coil receiving elements, and coils mounted on said elements, each of the sheaths being electrically discontinuous, said coils being connected across the gaps in the respective sheaths, the three core elements being magnetically connected in three phase arrangement to prevent the flow of triple harmonic current in the coils and sheath circuits.

8. In combination with the cable sheaths of a three phase transmission system, a reactor including a core of magnetic material having three coil receiving elements, and three coils mounted on the respective elements, said sheaths being electrically discontinuous and said coils being connected in star between the three cable sheaths, the three core elements being magnetically connected in three phase arrangement to prevent the flow of triple harmonic current in the coil and sheath circuits.

9. In a multiphase power transmission system wherein separate sheathed cables are used for each phase, the combination of a reactor including a core of magnetic material having a coil receiving element for each cable of the transmission system, and wound coils mounted on said core elements, said sheaths being electrically discontinuous and said coils being connected to bridge the gaps between the sheath lengths, said coils being grounded at their midpoint thus permitting direct current to drain in equal amounts from either side of the several cable sheaths, said current setting up opposing magneto motive forces in the several core members and preventing direct current saturation flux in the core.

10. In a three phase electric transmission system wherein the respective conductros are enclosed in separate metallic sheaths each comprising a number of separate sections insulated from one another, and wherein the sections for the respective conductors are cross-connected to provide circuits each comprising sheath sections of the three several conductors, in which circuits the induced voltages are in opposed directions at different sections, the combination of a star connected impedance connected to the respective sheaths, the neutral point of the impedance being grounded.

11. An electric circuit for transmitting alternating current wherein the conductors of the circuit are enclosed in separate metallic sheaths, and wherein the sheaths are in sections insulated from one another and the sections for one conductor are cross-connected with those of another conductor so as to provide sheath circuits in which the induced voltages are in opposite directions at different sections, characterized by the fact that there is combined with the sheath sections of the respective conductors a plurality of grounded reactance coils mounted on a common magnetic core structure.

12. An electric cable system for transmitting three phase currents wherein three insulated conductors respectively enclosed in metallic sheaths physically separated from each other constitute the transmission line, the sheaths of the several conductors being in sections insulated from each other and the sections of the three conductors, being serially connected in transposed relation so that the induced voltages in the serially connected sections of sheaths act to oppose each other and to prevent the flow of current, characterized by the fact that there is connected to the respective sheaths at a plurality of spaced intervals grounded magnetic coils, the coils at each of the respective points having a common magnetic circuit.

13. An electric circuit for transmitting three phase current, comprising three insulated conductors respectively enclosed in metallic sheaths physically separated from each other, the sheaths of the several conductors being in sections insulated from each other, and grounded reactance coils connecting adjacent sheath sections of each conductor, the coils connecting the sheath sections of the different phase conductors being mounted on a common magnetic core so as to produce magneto motive forces in opposition.

14. A poly-phase power transmission system comprising a separate metallic sheathed cable for each phase, each of the cable sheaths comprising a number of separate insulated sections, and means for electromagnetically interlinking the respective sheath sections of all of the phase conductors together.

In witness whereof, we hereunto subscribe our names this 3rd day of October, 1927.

HERMAN HALPERIN.
K. W. MILLER.